United States Patent [19]
Flotow

[11] 4,332,314
[45] Jun. 1, 1982

[54] SPRING CLUTCH

[75] Inventor: Richard A. Flotow, Fort Wayne, Ind.

[73] Assignee: Dana Corporation, Toledo, Ohio

[21] Appl. No.: 185,056

[22] Filed: Sep. 8, 1980

[51] Int. Cl.³ .............................................. F16D 13/44
[52] U.S. Cl. ................................ 192/89 B; 192/99 A; 192/70.29
[58] Field of Search ................. 192/89 B, 99 A, 99 B, 192/109 A, 98, 89 R, 70.27, 70.28, 70.29

[56] References Cited

U.S. PATENT DOCUMENTS

| | | | |
|---|---|---|---|
| 2,251,143 | 7/1941 | Loeffler | 192/70.28 |
| 2,407,728 | 9/1946 | Spase | 192/99 A |
| 3,021,931 | 2/1962 | Holz | 192/99 A |
| 3,314,511 | 4/1967 | Randol | 192/89 B |

*Primary Examiner*—George H. Krizmanich
*Attorney, Agent, or Firm*—Robert M. Leonardi; Norb A. Heban

[57] ABSTRACT

A friction clutch assembly is disclosed having an annular spring compressed between a clutch cover and a plurality of externally located release levers. The spring has tongues cooperating with indentations on the outside of the cover to centrally locate the spring and prevent it from rotating relative to the cover. An abutment may be formed on the cover for engagement by the spring to indicate when the clutch is in a fully worn position.

12 Claims, 7 Drawing Figures

SPRING CLUTCH

BACKGROUND OF THE INVENTION

This invention relates to friction clutch assemblies in general and is particularly directed to a resiliently loaded lever operating mechanism for these devices.

Lever operating mechanisms for friction type clutches require a certain amount of axial space in order to permit the levers to perform their desired function of engaging and disengaging the clutch. To reduce the axial length of the clutch assembly, it is common practice to provide an annular belleville type spring for applying the required resilient load. One method is to locate the spring internally between the clutch cover and pressure plate with the levers arranged to exert a pull against the pressure plate to overcome the spring load against the pressure plate. Another method used is to position the spring externally between the clutch cover and levers so that the levers carry the full spring load.

The latter design is desirable over the former because the spring is located entirely outside the cover. This eliminates contact between the spring and pressure plate thereby preventing direct conduction of heat from the pressure plate to the spring. Another advantage in this arrangement is the fact that the spring is in constant contact with the levers at all times whether in the releasing or engaging position. This eliminates the need for close fit of the levers or any additional means for holding the levers against rattling. With any design using a spring as described above, it is essential to properly locate the spring relative to the clutch operating parts so that it will function in its intended manner.

While arrangements exist which permit satisfactory operation and control of such springs, they have been complex and require more space than presently available in vehicle applications.

SUMMARY OF THE INVENTION

The present invention is an externally located actuating mechanism for a friction clutch assembly comprising a plurality of radially extending release levers and an annular spring ring positioned between the levers and the clutch cover. The cover has support means for centering and retaining the spring with integral stops provided on the support means to prevent the spring from bottoming out when the clutch is in a fully worn condition.

DESCRIPTION OF THE PREFERRED EMBODIMENT

Figure 1:
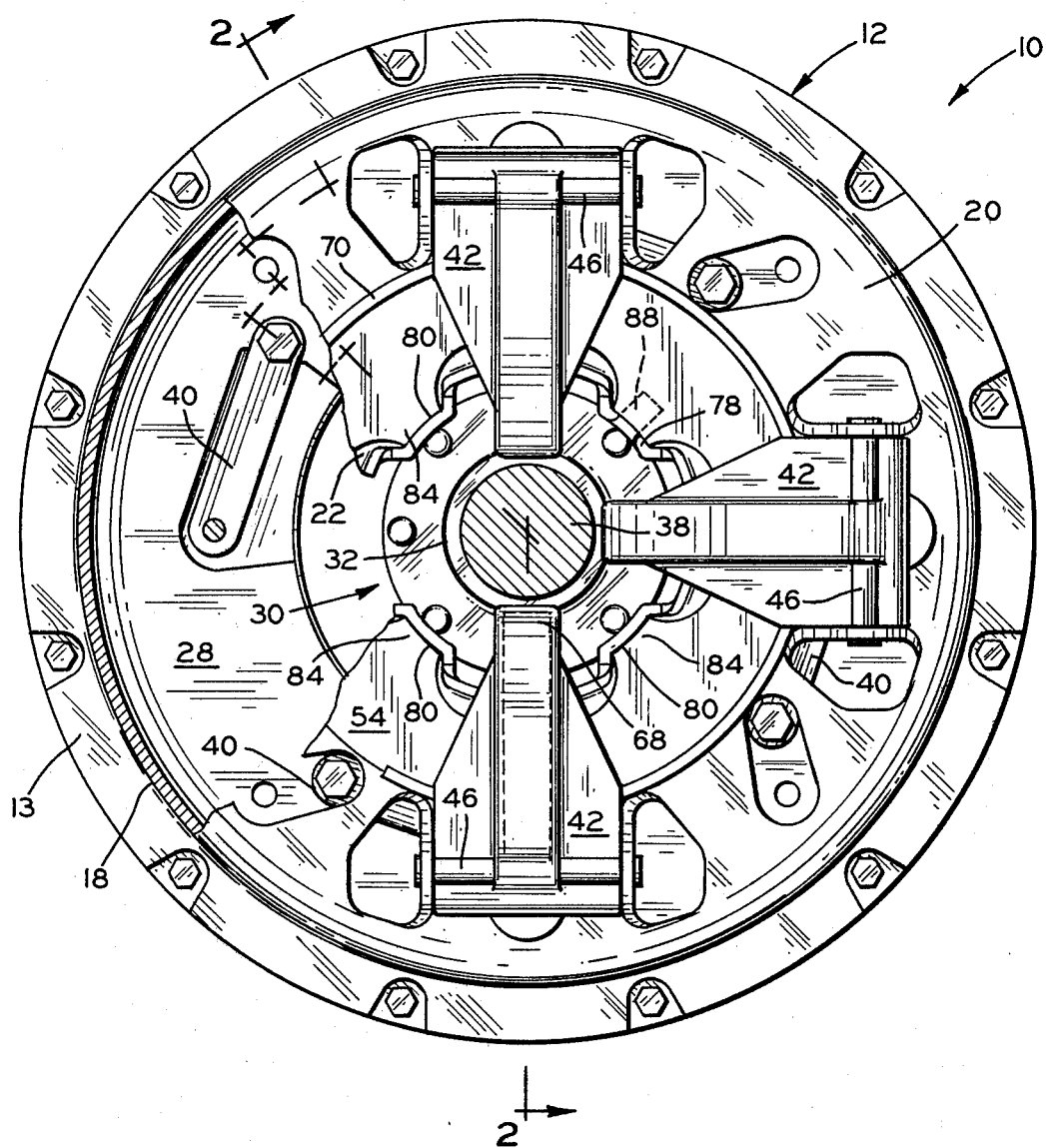
FIG. 1 is a rear elevational view of the clutch of the present invention with parts broken away to more clearly show certain features.
Figure 2:
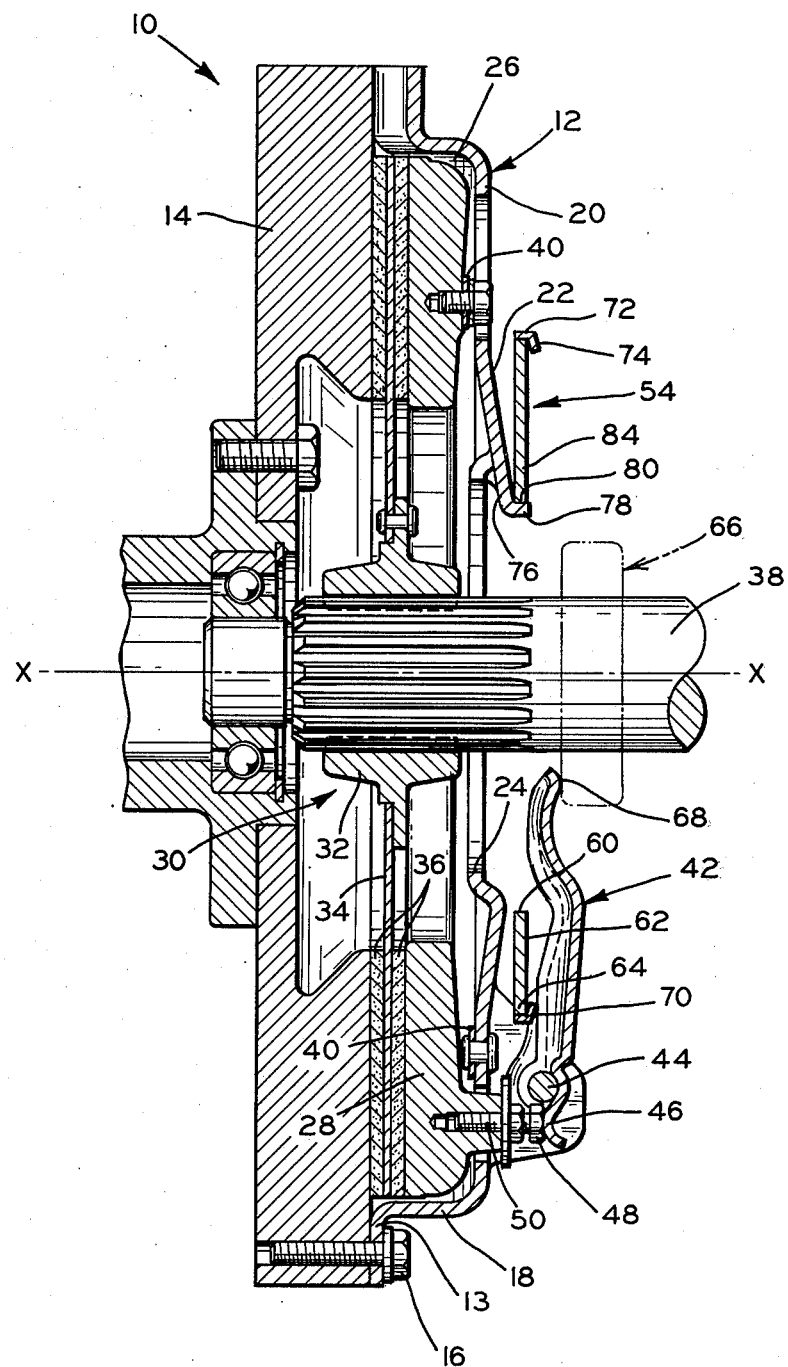
FIG. 2 is a cross-sectional view taken along line 2—2 of FIG. 1.
Figure 3:
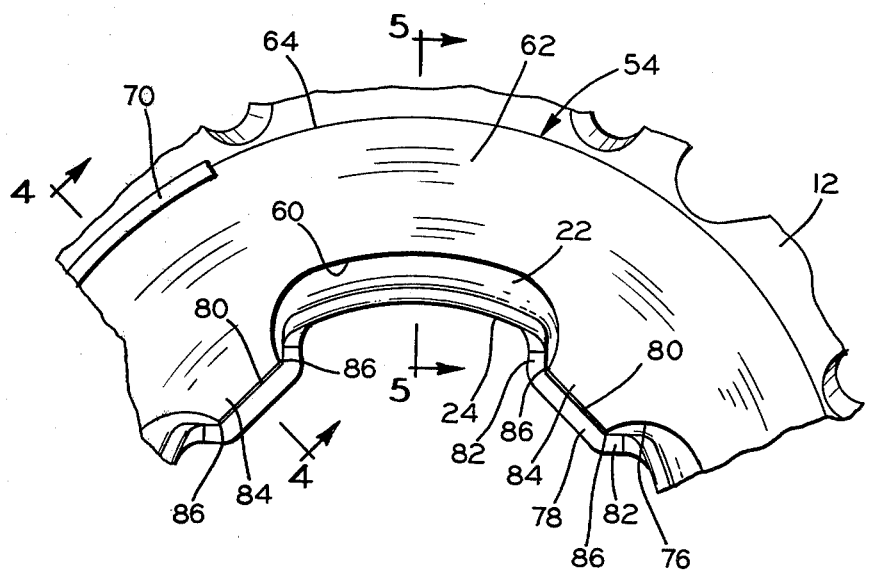
FIG. 3 is an enlarged partial rear elevational view of the cover and resilient means shown in FIG. 2.

Referring to FIGS. 1 and 2 of the drawings, in a preferred embodiment, a friction clutch is shown generally at 10 having a central axis X—X. Clutch 10 comprising an annular cover 12 having a peripheral flange portion 13 secured to the rear face of a standard flywheel 14 by a plurality of circumferentially spaced bolts 16 so that the cover 12 rotates with the flywheel 14. Cover 12 further comprises a rim portion 18 extending in a generally axial direction and an end wall 20 extending radially inwardly from the rim portion 18 and terminating in an angular disposed ramp 22. The radially inner portion of ramp 22 defines a central opening 24 in the cover end wall 20.

An annular space 26 is provided between flywheel 14 and the cover 12 for receiving a pressure plate 28. A driven disc 30 is adapted to be clamped between the pressure plate 28 and the flywheel 14.

Driven disc 30 comprises a central hub 32 having a support plate 34 secured thereto with friction facing 36 fastened on opposite sides of the outer peripheral portion of the support plate 34. Central hub 32 is splined to the outer end of a transmission input shaft 38 with the friction facing 36 positioned between the pressure plate 28 and flywheel 14. The splined connection permits the driven disc 30 to move freely in an axial direction relative to the input shaft 38 while being rotatable with it.

Pressure plate 28 is axially movable into engagement with driven disc 30 to clamp the same to the flywheel 14 to drivingly connecting the rotatable drive and driven members of the clutch. A plurality of circumferentially spaced drive straps 40 rotatably connect the pressure plate 28 to the cover 12 and permit limited axial movement of the pressure plate 28 relative to the cover 12. Drive straps 40 further serve as means to lift the pressure plate 28 away from the flywheel when the clutch 10 is moved to its disengaged position. The opposite ends of drive straps 40 are connected to the cover 12 and pressure plate 28 in a conventional manner.

A lever operating mechanism is provided to move the pressure plate 28 axially relative to the cover 12 into and out of engagement with the driven disc 30. The lever operating mechanism is disposed wholly outside the cover 12 and comprises a plurality of radially extending levers 42 pivotally connected to the cover 12 by pivot pins 44. Lever outer ends 46 engage a head 48 formed on a screw 50 threadedly fastened to the pressure plate 28.

Resilient means are provided to apply an axially engaging force to pressure plate 28 to normally urge the same into clamping engagement with the driven disc 30. The resilient means is designed to maintain a substantially constant engaging pressure regardless of wear on the driven disc friction facing 36. In a preferred embodiment, the resilient means is an annular spring washer 54 of the belleville type compressed between the cover 12 and levers 42. Spring washer 54 in its unstressed state, is conical in shape having an inner peripheral portion 60, an intermediate cone-shaped portion 62 and an outer peripheral portion 64. Inner and outer peripheral portions 60 and 64 are axially spaced and approach the same plane as spring 54 is placed under compression. Spring washer 54 is designed to have the inner peripheral portion 60 (fixed) react against the cover 12 and the outer peripheral portion 64 (movable) engage and be movable with the levers 42. Because of the spring washer movement, the cover ramp 22 is sufficiently angled to permit clearance during operation.

Levers 42 are arranged to be depressed against the action of spring washer 54 by a throw-out bearing 66 operating against inner ends 68 of levers 42. Operation of throw-out bearing 66 causes levers 42 to pivot about pins 44 so that the outer ends 46 respond by moving the pressure plate 28 to clamp the driven disc 30 against flywheel 14.

To equally distribute load and stress from the washer to the levers 42, an annular collector ring 70 is provided. Collector ring 70 is cup-shaped in cross-section and comprising an annular axially extending rim 72 encircling the outer peripheral portion 64 of spring washer 54 and a radially inwardly extending annular base 74. Base 74 is adapted to be positioned between the back face of spring washer 54 and adjacent front face of levers 42. Thus, base 74 transfers the reaction load of the spring washer 54 to the levers 42. Base 74 is disposed at a slight angle to provide clearance for the spring washer outer peripheral portion 64 when the levers 42 are pivoted to their clutch disengaged position.

Collector ring 70 has sufficient clearance with respect to washer outer peripheral portion 64 to permit it to move freely during the various clutch operating stages. Since levers 42 are in constant contact with the collector ring base 74, they serve to maintain the collector ring 70 in place against the spring washer 54. If desired, spring washer 54 may act directly against the levers 42. However, it has been found that, rather than concentrating the engaging load directly under the levers 42, an equal distribution of load results by providing the annular collector 70.

Figure 4:
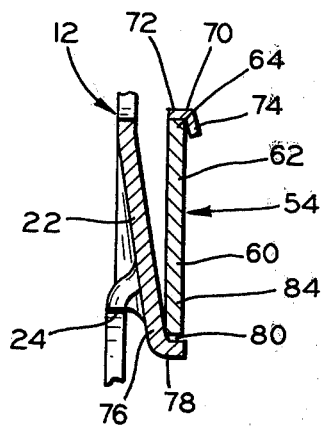
FIG. 4 is a cross-sectional view taken along line 4—4 of FIG. 3.
Figure 5:
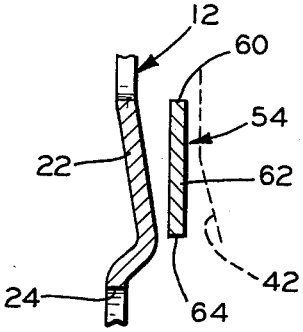
FIG. 5 is a cross-sectional view taken along line 5—5 of FIG. 3.

Restraint means are attached to cover 12 for cooperating with positioning means attached to spring washer 54 to concentrically locate the spring washer 54 with respect to the clutch axis X—X and prevent relative rotational movement between it and cover 12. The restraint means comprises a plurality of circumferentially spaced tabs 76 extending inwardly from the cover ramp 22 toward the clutch axis X—X. Integrally formed on the inner end of each tab 76 is a lip 78 which extends outwardly in a direction parallel to the clutch axis X—X. Lips 78, as shown in FIG. 4, further comprise indentations 80 for receiving the positioning means formed as an integral part of spring washer 54. The indentation results in angularly disposed and spaced shoulders 82 provided therein.

The positioning means on spring washer 54 comprise a plurality of circumferentially spaced tongues 84 extending inwardly from the spring washer inner peripheral portion 60. Tongues 84 are equal in number and of such size as to closely fit the contour of indentations 80. The spacing is such as to provide the necessary clearance for spring washers 54 as it flattens during its operation. The spaced outer edges of the tongue inner ends form stops 86 engageable with the inside surface of angular shoulders 82 of indentations 80. The tolerances are such that top surface of indentation 80 and mating bottom surface of tongues 84 cooperate to centrally position the spring washer 54 about the clutch axis X—X. Further, the tongue spaced outer edges or stops 86 cooperate with the mating internal surfaces of the angled shoulders 82 to prevent spring washer 54 from rotating relative to the cover 12.

With the arrangement thus far described, it will be seen that the addition of tongues 84 on spring washer inner peripheral portion 60 results in a substantial increase in the distance from the spring washer outer periphery 64 to the inner edge of the tongues 84. This results in a radially lengthening of the spring washer intermediate portion 62 at the circumferentially spaced tongue locations allowing more deflection in the spring washer 54 without increasing load.

Figure 6:
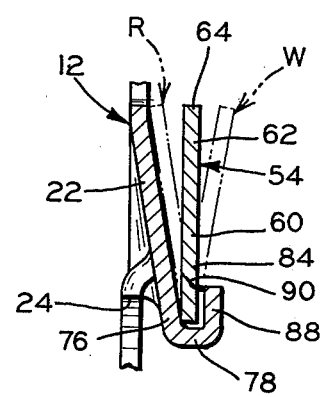
FIG. 6 is a cross-sectional view similar to FIG. 4 showing an alternate embodiment.
Figure 7:
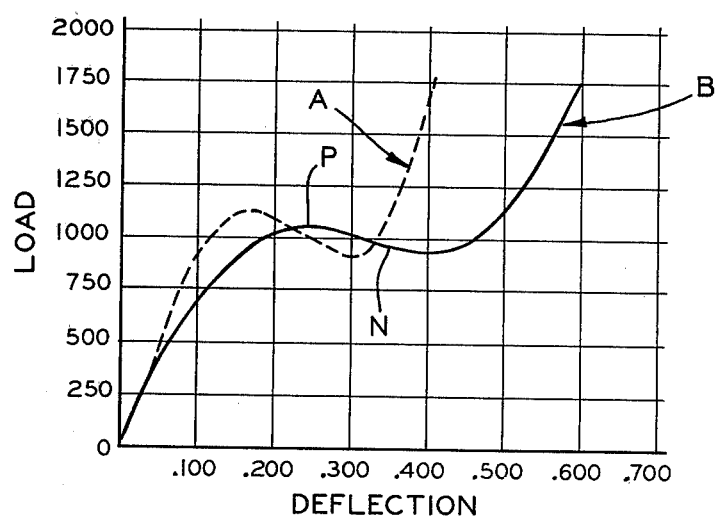
FIG. 7 is a graph showing a load/deflection curve for the resilient means of the present invention.

Reference is made to the graph shown in FIG. 7 to show the comparison between the spring washer 54 of the present invention and a standard belleville washer. The deflection curve indicated by dotted lines A was developed from a standard belleville washer. As a comparison, the solid line B depicts the deflection curve developed from the tongued belleville washer 54 illustrated in FIGS. 1–6. The peak load is indicated at P and the negative rate portion of the curve is indicated at N.

In the preferred embodiment, the inner bottom edges of spring washer tongues 84 engage and act against the outer surface of tab 76 while the outer spring washer peripheral portion 64 reacts against the insides of levers 42 through collector ring 70. Thus, tongues 84 provide a plurality of circumferentially spaced reaction surfaces on the interior of spring washer 54 while the action surface on the exterior is annular.

Referring to FIG. 4, it will be seen that, in cross-section, cover ramp 22, tabs 76 and lips 78 define substantially L-shaped legs with spring washer tongues 84 being wholly within the area of lip 78. An alternate embodiment illustrated in FIG. 6 provides an integral abutment on at least one of the lips 78 engageable by the spring washer tongues 84 to indicate when the clutch 10 is in a fully worn position. Preferably, to maintain balance and proper indication of wear, each lip 78 should be provided with an integral abutment. The abutment comprises an outwardly extending flange 88 (see FIG. 1—dotted lines). Flange 88 is integral with lip 78 and extends in a direction substantially perpendicular to clutch axis X—X. The radially outermost inner edge of lip 78 forms a fixed stop 90 which is designed to engage the outer surface of spring washer tongue 84 and act to keep spring washer 54 from bottoming out or achieving an over-center position when the clutch is in a fully worn position.

Flange 88 is bent over at a preselected angle so that fixed stop 90 is located at a point corresponding to the fully worn position of the clutch. While flange 88 is shown extending in a direction perpendicular to the clutch axis X—X, it is possible that it could be angularly disposed to either side in order to position the stop 90 in a desired location. The presence of flange 88 and position of stop 90 allows spring washer 54 to stop at a position that would coincide with allotted facing wear of driven disc 30. At this point the levers 42 would sense free travel or no-load effect. This would indicate to an operator that the clutch is worn.

In the normally engaged position of the clutch 10 as illustrated in FIG. 2, spring washer 54 is arranged with relation to the remainder of the clutch mechanism so that pressure will be exerted against its inner and outer peripheries 60 and 64 respectively. As indicated, it is assembled under initial compression so as to bring its inner and outer peripheries closer together in an axial direction. During clutch release operation its peripheries will be further deflected toward a common plane (flattening-out) as illustrated in dotted lines R in FIG. 6. As the friction facings 30 wear, the peripheral portions move further apart axially tending to approach the free or relaxed condition of the spring washer. The location of the flange 88 and stop 90 thereon are designed so that the outer surface of spring washer tongue 84 will come in contact with stop 90 and prevent spring washer 54 from reaching a position beyond that shown by dotted lines W in FIG. 6. The dotted line W indicates the position of spring washer 54 when the clutch is in a fully worn position. In this position spring washer 54 will no longer be responsive to apply a biasing force against the insides of levers 42.

It is obvious that other types of annular spring washers may be used in place of the cone type shown, e.g., slotted, finger, curved types as well as single or stacked versions of the wave washer type.

From the foregoing description, it is apparent that the advantages of the present invention result from the combined relationship of the restraint portion formed on the clutch cover 12 and the positioning means constructed on the spring washer 54. The arrangement is such as to provide a satisfactory operative connection for the parts in a limited axial space. Further, the provision of the collector ring 70 to equally distribute load to the levers 42 and the alternate wear indicator feature result in additional advantages in a clutch of this type.

Having thus described preferred embodiments of the present invention, it should be understood that the invention is not to be limited to the specific construction and arrangement described. It will be apparent to those skilled in the art that modifications or alterations may be made without departing from the spirit and scope of the invention as set forth in the appended claims.

I claim:

1. In a friction clutch adapted to drivingly connect rotatable drive and driven members, said clutch having a central axis about which said drive and driven members are rotatable, said clutch comprising:
   a cover secured to said drive member for rotation therewith,
   a pressure plate connected to said cover for rotation therewith and for limited axial movement relative thereto,
   a pivotable lever disposed outside of said cover for moving said pressure plate axially relative to said cover into and out of engagement with said driven member and
   an annular spring compressed between said cover and said lever;
   a improvement comprising
   spring restraint means attached to said cover, and
   positioning means attached to said spring, said positioning means engaging said spring restraint means to locate said spring about said clutch axis and prevent relative rotational movement between said spring and said cover.

2. A friction clutch according to claim 1 wherein said spring restraint means comprises at least one tab having a lip formed thereon.

3. A friction clutch according to claim 2 wherein said positioning means comprises at least one tongue on said spring engaging said lip.

4. A friction clutch according to claim 3 wherein said lip further comprises a depression, said spring tongue received in said depression.

5. A friction clutch according to claim 4 wherein said depression and said tongue further comprise stops engageable to prevent relative rotation between said cover and said spring.

6. A friction clutch according to claim 1 wherein said spring restraint means further comprises an abutment engageable by said spring when said clutch is in a fully worn position.

7. A friction clutch according to claim 2 wherein said lip further comprises an abutment attached to said lip engageable by said spring when said clutch is in a fully worn position.

8. A friction clutch according to claim 7 wherein said tab, said lip and said abutment define a U-shaped channel for receiving said spring tongue.

9. A friction clutch according to claim 3 wherein said tab extends inwardly toward said clutch axis, said lip extends outwardly parallel to said clutch axis, said spring tongue extends inwardly toward said clutch axis.

10. A friction clutch according to claim 1 wherein said annular spring is a belleville washer.

11. A friction clutch according to claim 10 wherein said belleville washer comprises inner and outer peripheral portions, said positioning means extends inwardly from said inner peripheral portion, and wherein said friction clutch further comprises an annular collector ring surrounding said belleville washer outer peripheral portion, said collector ring engaging and movable with said levers.

12. In a friction clutch adapted to drivingly connect rotatable drive and driven members and having a central axis,
   an axially stationary cover secured to said drive member for rotation therewith,
   an axially movable pressure plate connected to said cover for rotation therewith and limited axial movement relative thereto,
   pivotally movable levers disposed outside of said cover for moving said pressure plate axially relative to said cover into and out of engagement with said driven member and
   an annular belleville washer compressed between said cover and said levers having an inner peripheral portion and an outer peripheral portion engaging and movable with said lever,
   the improvement comprising
   belleville washer restraint means attached to said cover, said restraint means comprising a plurality of circumferentially spaced tabs, integral lips on said tabs having depressions formed therein;
   positioning means attached to said belleville washer, said positioning means comprising a plurality of circumferentially spaced tongues on said spring inner periphery received in said depressions and engaging said tabs,
   stops on said tongues and said depressions engageable to prevent relative rotational movement between said cover and said belleville washer.

* * * * *